United States Patent
Stark et al.

(10) Patent No.: US 10,815,078 B2
(45) Date of Patent: Oct. 27, 2020

(54) CONVEYOR INSTALLATION AND METHOD FOR CONVEYING PLASTICS GRANULATE

(71) Applicant: Coperion GmbH, Stuttgart (DE)

(72) Inventors: Bernhard Stark, Fronreute (DE);
Michael Duerr, Wolfegg (DE);
Thomas Vögele, Binzwangen (DE);
Christian Dikreuter, Immenstaad (DE);
Christian Toni, Ravensburg (DE)

(73) Assignee: Coperion GmbH, Stuttgart (DE)

( * ) Notice: Subject to any disclaimer, the term of this patent is extended or adjusted under 35 U.S.C. 154(b) by 0 days.

(21) Appl. No.: 15/903,400

(22) Filed: Feb. 23, 2018

(65) Prior Publication Data
US 2018/0244482 A1 Aug. 30, 2018

(30) Foreign Application Priority Data
Feb. 24, 2017 (DE) .................... 10 2017 203 089

(51) Int. Cl.
*B65G 53/60* (2006.01)
*B65G 53/16* (2006.01)
*B65G 53/52* (2006.01)

(52) U.S. Cl.
CPC ............ *B65G 53/60* (2013.01); *B65G 53/16* (2013.01); *B65G 53/526* (2013.01); *B65G 2201/042* (2013.01)

(58) Field of Classification Search
CPC ................ B65G 53/60; B65G 53/14
See application file for complete search history.

(56) References Cited

U.S. PATENT DOCUMENTS

| | | | | |
|---|---|---|---|---|
| 2,276,805 A | * | 3/1942 | Tolman, Jr. ............ | B65G 53/60 406/172 |
| 3,384,420 A | * | 5/1968 | Fiscus .................... | B65G 53/06 406/173 |
| 4,697,962 A | * | 10/1987 | Dunbar ................. | B65G 53/12 406/120 |
| 5,042,169 A | | 8/1991 | Vero | |
| 5,487,225 A | * | 1/1996 | Downie ................ | B29B 13/065 34/473 |
| 5,788,083 A | * | 8/1998 | Krambrock ............. | B07B 7/02 209/139.1 |
| 6,321,461 B1 | * | 11/2001 | Ogasahara .............. | F26B 3/343 34/168 |
| 6,368,028 B1 | * | 4/2002 | Nester ................... | B65G 53/28 406/109 |

(Continued)

FOREIGN PATENT DOCUMENTS

DE 538275 C 11/1931
DE 11 64 321 B 2/1964
(Continued)

*Primary Examiner* — William R Harp
(74) *Attorney, Agent, or Firm* — McGlew and Tuttle, P.C.

(57) ABSTRACT

A conveyor installation for plastics granulate comprises a dispatch location at which the plastics granulate with a pressurised carrier gas is dispatched into a conveyor line, a target location that in terms of conveyance is connected to the dispatch location, a humidification unit for humidifying the carrier gas and/or the plastics granulate by adding liquid, wherein a separation device for separating the humid carrier gas from the plastics granulate is provided at the target location.

20 Claims, 13 Drawing Sheets

(56) References Cited

U.S. PATENT DOCUMENTS 6,582,161 B2 * 6/2003 Noguki ............... B65G 53/526
　　　　　　　　　　　　　　　　　　　　　406/197
2014/0084504 A1 3/2014 Christel et al.

FOREIGN PATENT DOCUMENTS

| DE | 27 20 094 A1 | 11/1978 |
| DE | 3327461 A1 | 2/1985 |
| DE | 691 11 611 T2 | 12/1995 |
| DE | 198 40 502 C1 | 3/2000 |
| EP | 1381634 B1 | 11/2008 |
| EP | 2 712 881 B1 | 5/2015 |
| JP | H10147433 A | 6/1998 |

* cited by examiner

CONVEYOR INSTALLATION AND METHOD FOR CONVEYING PLASTICS GRANULATE

CROSS-REFERENCES TO RELATED APPLICATIONS

This application claims the priority of German Patent Application, Serial No. 10 2017 203 089.5, filed Feb. 24, 2017, pursuant to 35 U.S.C. 119(a)-(d), the content of which is incorporated herein by reference in its entirety as if fully set forth herein.

FIELD OF THE INVENTION

The invention relates to a conveyor installation for plastics granulate and to a method for conveying plastics granulate.

BACKGROUND OF THE INVENTION

EP 2 712 881 B1 discloses a method and a device for the direct crystallization of polymers under inert gas. DE 27 20 094 A1 discloses a method and a device for separating the air from pneumatically conveyed granulates and powders. A method for pneumatically conveying plastics granulate is known from DE 198 40 502 C1. The formation of dusty abrasive wear and the creation of so-called "angel hair" can be reduced by adding liquid. According to DE 198 40 502 C1, a controlled addition of liquid is performed in such a manner that the relative humidity of the carrier gas at the target location is below the saturation limit A comparatively complex control is required to this end. In the case of changes in the process parameters at the target location, and thus an associated change in the saturation limit of the carrier gas, the added liquid can condense in a receiving container and compromise the storage and the further handling of the plastics granulate.

SUMMARY OF THE INVENTION

It is an object of the present invention to utilize the advantages of pneumatic conveying while adding liquid, on the one hand, and to reliably exclude without complexity the condensing of liquid at the target location, in particular in a receiving container, on the other hand This object is achieved according to the invention by a conveyor installation for plastics granulate, comprising
  a dispatch location at which the plastics granulate with a pressurized carrier gas is dispatched into a conveyor line;
  a target location that in terms of conveyance is connected to the dispatch location;
  a humidification unit for humidifying the carrier gas and/or the plastics granulate by adding liquid;
wherein a separation device for separating the humid carrier gas from the plastics granulate is provided at the target location.

The object is further achieved by a method for conveying plastics granulate which at a dispatch location with a pressurized carrier gas is dispatched into a conveyor line and is conveyed to a target location that in terms of conveyance is connected to the dispatch location, wherein the carrier gas and/or the plastics granulate is humidified by adding liquid, and wherein a separation of the humid carrier gas from the plastics granulate is performed in a separation device.

It has been recognized according to the invention that a condensation of humid carrier gas at the target location can be reliably excluded in that the humid carrier gas is separated from the plastics granulate by means of a separation device. The separation is performed in particular by means of a replacement gas which is dry in particular in comparison with the humid carrier gas. In particular, the relative humidity of the replacement gas at comparable process conditions is lower than the relative humidity of the carrier gas. The relative humidity of the mixture of the carrier gas and of the replacement gas at the end of the conveyor line, depending on the process conditions, is at most 100%, in particular at most 80%, and in particular at most 60%. It is conceivable in particular that a cold replacement gas can have a relative humidity of 100% or more, wherein the relative humidity of the replacement gas by contacting warm plastics granulate and/or carrier gas can effect a reduction in the relative humidity of the mixture of carrier gas and replacement gas to below 100%.

The humid carrier gas is deposited by the material flow in the conveyor installation. The separation device can also be referred to as a depositing device.

It is prevented that humid carrier gas condenses at the target location, in particular within a receiving container. In particular, air serves as the carrier gas. The carrier gas is therefore also referred to as carrier air. The target location for pneumatically conveying the plastics granulate, in terms of conveyance, is connected to a dispatch location. The plastics granulate at the dispatch location with a pressurized carrier gas is dispatched into a conveyor line. The plastics granulate has been produced in a preceding granulation process. The structure of the polymer can be modified in a crystallization process following the granulation. The plastics granulate such produced can be conveyed from the dispatch location to the target location in the conveyor installation. Additional production or processing steps for completing the plastics granulate are not required, in particular within the conveyor installation. The plastics granulate is readily disposable at the dispatch location. The plastics granulate has a particle diameter that is equivalent to 2 mm to 5 mm of a sphere of identical volume.

A humidification unit serves for humidifying the carrier gas and/or the plastics granulate by adding liquid. In particular, water, in particular demineralized water, serves as a liquid for humidifying the carrier gas. The humidification unit comprises in particular a separate liquid connector so as to add liquid directly to the carrier gas and/or the plastics granulate. A plurality of humidification units can also be provided so as to humidify the carrier gas and/or the plastics granulate in a targeted manner along the conveying path. Additionally or alternatively, it is also possible that the humidification unit is formed in that humid plastics granulate is added to the carrier gas. The humidity of the plastics granulate is at least in proportions dispensed to the carrier gas such that the preconditions for the pneumatic conveyance under the addition of humidity are guaranteed. A liquid feed from a separate liquid connector can be dispensable on account thereof. Polyolefin granulate which after underwater pelletizing is not or only incompletely dried, for example by mechanical de-watering, can serve as the humid plastics granulate. The complexity in terms of apparatus for the humidification is reduced by the use of humid plastics granulate. Humid carrier gas in the context of the invention is to be understood as carrier gas having a relative humidity of at least 60% and at most 200% at the end of the conveyor line. The relative humidity herein is defined as the ratio of the mass of the vapour of the liquid that is contained in the carrier gas to the largest possible mass in terms of vapour of this liquid which the carrier gas can receive under the given conditions such as pressure and temperature. A complete saturation of the carrier gas with liquid is present at a relative humidity of 100%. A further addition of liquid leads to an oversaturation of the carrier gas and thus to the condensing of the liquid. It is conceivable in particular that the carrier gas along the conveyor line is oversaturated with the liquid. It is conceivable in particular that the relative humidity of the carrier gas at the target location, in particular in the separation device, reaches at maximum the saturation limit.

A region in which packing and/or loading the plastics granulate into a packaging or into a transportation container is performed is to be understood in particular as the target location of the conveyor installation. A transportation container can be a transportable container, for example a shipping container.

It is conceivable in particular that the carrier gas along the conveyor line, in particular upstream of the target location, has a relative humidity which is higher than 100%. It is also conceivable that storage containers into which the plastics granulate with a carrier gas is conveyed at a relative humidity of up to 100% are disposed along the conveyor line, upstream of the target location.

It is in particular a concept of the present invention that any potential condensation of water from the carrier gas can be accepted in a storage container that is disposed upstream of the target location as long as a reliable separation of the humid carrier gas is performed by means of the separation device at the target location.

A conveyor installation, in which at least one receiving container is disposed at the target location, enables the plastics granulate to be stored directly at the target location. In particular, a plurality of receiving containers can be provided at the target location. A receiving container in this context is a stationary or mobile receptacle vessel in which the plastics granulate can be stockpiled at least temporarily or for the long term. A receiving container is in particular a storage silo. A receiving container has a receptacle volume of at least 1 $m^3$, in particular at least 100 $m^3$, and in particular at least 1000 $m^3$. A receiving container can however also be a container that is transportable on a vehicle, in particular commercial motor vehicle or a rail vehicle.

A receiving container can be embodied so as to be thermally insulated so as to reduce and in particular avoid cooling of the content thereof in the proximity of the wall by a cold environment. The thermal insulation is in particular embodied by an additional insulation layer from a thermally insulating material.

In the case of a conveyor installation, in which the separation device is connected to the conveyor line, wherein the separation device is connected to the target location by way of at least one target location conveyor line, or in which the separation device has a separation container that is connected to the receiving container, wherein in particular a plurality of receiving containers are connected to the separation container, the separation of the humid carrier gas is performed in the separation device that is upstream of the receiving container. A subsequent conveyance from the separation device into the at least one receiving container is performed by means of a target location conveyor line. Short conveying paths can be implemented in the case of an arrangement of the target location conveying line of this type between the separation device and the at least one receiving container. It is in particular possible for a central separation device to be provided for a plurality of receiving containers. It is conceivable for a dedicated, separately assigned separation device to be provided for each receiving container.

The separation device in particular has a separation container. A housing which is in particular produced from a metallic material, in particular from a steel material or an aluminium material, is understood as a separation container. Alternatively, the housing can be produced from a glass fibre reinforced plastics. A mixture from plastics granulate and humid carrier gas is fed into the housing, and the humid carrier gas that has been separated from the plastics granulate, and the plastics granulate, are in each case separately discharged into the receiving container. To this end, the housing in the interior can have additional separation components which advantageously influence the material flows of the plastics granulate and/or humid carrier gas, in particular in terms of the mutual separation. The separation of the humid carrier gas from the plastics granulate takes place within the separation container. The separation container is in particular disposed upstream in relation to the receiving container. The separation of the humid carrier gas takes place prior to the plastics granulate being conveyed into the receiving container. The separation container has a reduced volume as compared to the receiving container. The separation container can serve for at least temporarily stockpiling the plastics granulate in that the separation container makes available a storage volume for the plastics granulate.

One embodiment of the separation container, in which the separation container is a solid matter deposition container which is embodied in particular as a preliminary precipitator, as a total precipitator, as a cyclone, or as a classifier, in particular as an elbow/counter flow classifier, enables an uncomplicated implementation of the separation device without complexity. Separation containers of this type are known in other applications, in particular for classifying particulate material, thus for depositing fines from a particle flow. Fines can have a size distribution from 20 µm to 500 µm, and in particular from 63 µm to 500 µm. Surprisingly, it has been found that containers of this type are also suitable as separation containers for separating the humid carrier gas.

A shut-off unit disposed between the separation container and the receiving container enables the target location conveyor line between the separation container and the receiving container to be shut off in a targeted and self-regulating manner Shutting-off is performed in particular so as to depend on a filling level of the plastics granulate in the deposition container. The shut-off unit is in particular a spring-loaded flap or a spring-loaded cone. The shut-off unit can also be embodied as a rotary valve which as a metering element moreover enables metering of the plastics granulate from the receiving container. The shut-off unit can also be an in particular regulatable slide.

A regulated operating mode of the shut-off unit is possible by way of the separation container having a filling-level monitor having at least one filling-level sensor. The current filling level in the separation container can be detected by way of the at least one filling-level sensor and be monitored by means of the filling-level monitor. The filling-level monitor which is in signalling connection with a centrally disposed regulator unit can transmit a respective signal to the shut-off unit which is likewise in signalling connection with the regulator unit so as to at least partially initiate opening or closing of the shut-off unit.

In the case of a connection of the target location to the conveyor line, in which the separation device is in particular integrated in the receiving container, a direct conveyance of the plastics granulate to the target location is provided. In this case, the separation device is in particular integrated in the at least one receiving container. In particular, each receiving container has an integrated separation device. The conveyor line is embodied in an uncomplicated manner Additional separation containers are dispensable.

An exhaust air line at the target location, in which an exhaust air line for expelling exhaust air having carrier air that at least in proportions is humid to the environment and/or to an aspiration is connected to the conveyor installation at the target location, wherein the exhaust air line is connected in particular to the separation container and/or to the receiving container, guarantees the discharging of exhaust air to the environment and/or to an aspiration. The exhaust air at least in proportion comprises humid carrier air. An aspiration in the context of the invention is understood to be the targeted discharging of the exhaust air by way of an exhaust air line system that is connected to a suction system. The exhaust air line is connected in particular to the separation container and/or to the receiving container.

A replacement gas unit for replacing the humid carrier air with the replacement gas is provided, wherein the replacement gas unit is disposed on the separation device and/or on the receiving container, simplifies the replacement of the humid carrier air by the in particular dry replacement gas. The replacement gas unit is disposed in particular on the separation device and/or on the receiving container. The replacement gas unit enables the feed of replacement gas in order for the humid carrier air to be separated from the plastics granulate, thus to replace the humid carrier air. A replacement gas in the context of the invention is understood to be in particular gas that is fed in a separate manner, for example in the form of purge air in the receiving container and/or on the separation container. A deodorization in order for volatile proportions of the plastics granulate that cause an unpleasant odour and in particular do not pose any risk of explosion to be purged can be provided in the receiving container, for example. It is also conceivable that the receiving container as a degassing silo is embodied in such a manner that oxygenated hydrocarbons such as ethylene, hexane and/or hexene, or similar, is removed from the plastics granulate with the aid of the replacement gas. The purge gas, or the purge air, respectively, serves as the replacement gas. Replacement gas in the context of the invention is however also displacement gas which is displaced from a closed receiving container by adding the plastics granulate into the receiving container. The displacement gas in the receiving container rises to the top and there can make its way as the replacement gas into the separation device. Displacement gas and/or leaked air and/or bearing rinsing from a rotary valve as the shut-off unit can also rise as replacement gas into the receiving container.

A conveyor installation, in which a plurality of conveyor lines are connected to the separation device, in particular to the separation container, enables an efficient utilization of the separation device. To this end, in particular a plurality of conveyor lines are connected to a single separation container.

The construction of a conveyor installation, in which a heater, in particular for heating the replacement gas, is dispensable for the separation device, is embodied in a simplified and in particular cost-saving manner. A separate heater, in particular for heating the replacement gas, is dispensable. The use of a heater is known, for example, from JP H-10147433 A, the entire contents of which are incorporated herein by reference. The heater heats a gas counter flow in order for the surface of the wet product to be dried. The wet product has a water content of 1 to 20 percent by mass of the conveyed product. The replacement of humid carrier gas is not known from JP H-10147433 A, the entire contents of which are incorporated herein by reference.

The method for conveying plastics granulate which at a dispatch location with a pressurized carrier gas is dispatched into a conveyor line and is conveyed to a target location that in terms of conveyance is connected to the dispatch location, wherein the carrier gas and/or the plastics granulate is humidified by adding liquid, and wherein a separation of the humid carrier gas from the plastics granulate is performed in a separation device, has substantially the advantages which have already been explained by means of the conveyor installation, reference hereby being made thereto. A substantial advantage is to be seen in that the plastics granulate can advantageously be conveyed by means of humid carrier gas which, in particular along the conveyor line, at least in portions is oversaturated, wherein the condensing of the liquid at the target location, in particular in the receiving container, is reliably excluded.

The use of replacement gas for separating the humid carrier gas from the plastics granulate increases the reliability of the separation procedure.

Carrying out a method, in which the separation of the humid carrier gas is performed without any additional heating of the replacement gas, is direct. An additional heating step for separating the humid carrier gas is dispensable. The investment in terms of energy is reduced. The investment costs of the associated conveyor installation are reduced.

Exemplary embodiments of the invention will be explained in more detail hereunder by means of the drawing.

DESCRIPTION OF THE PREFERRED EMBODIMENTS

Figure 1:
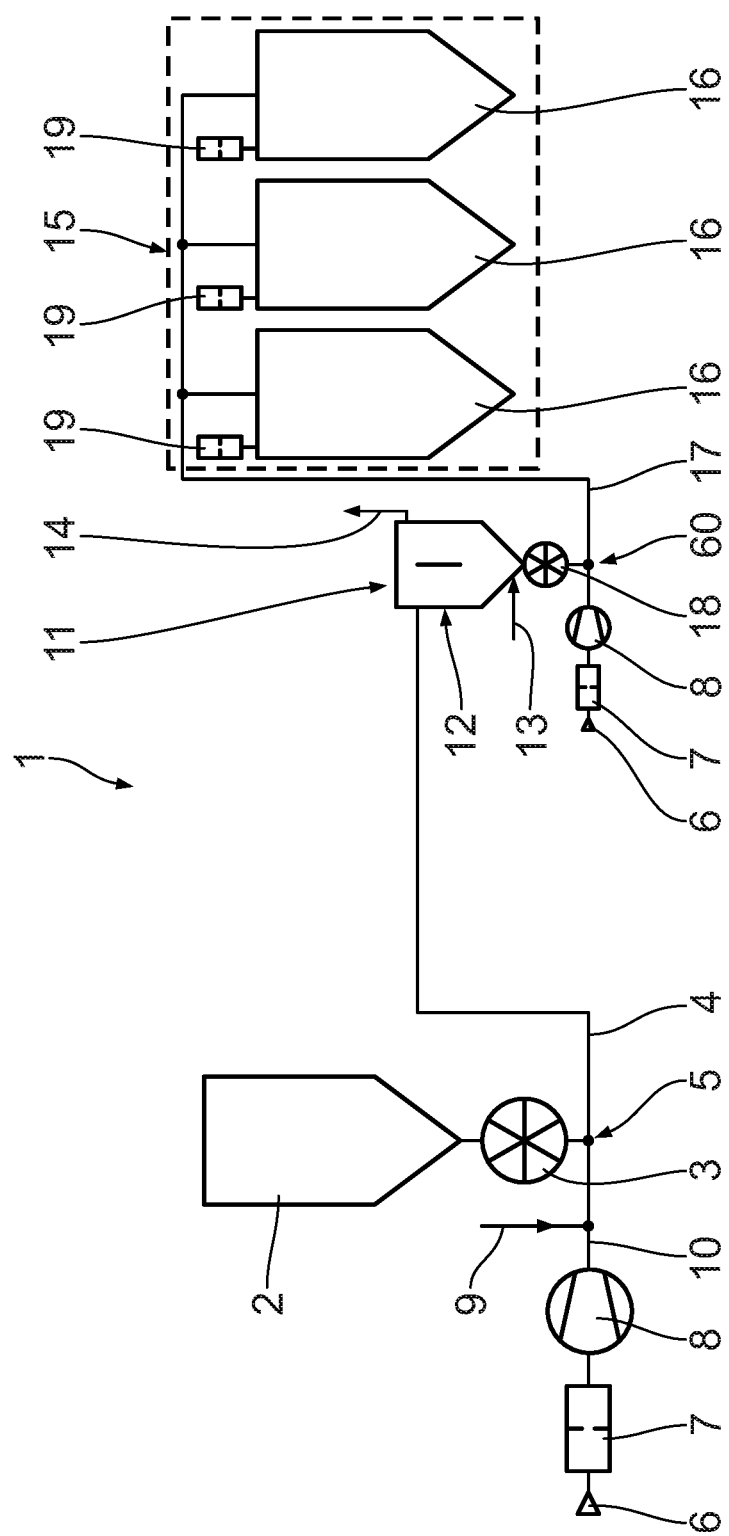
FIG. 1 shows a schematic illustration of a conveyor installation according to the invention, in which a separation container of a separation device is connected to the conveyor line.
Figure 2:
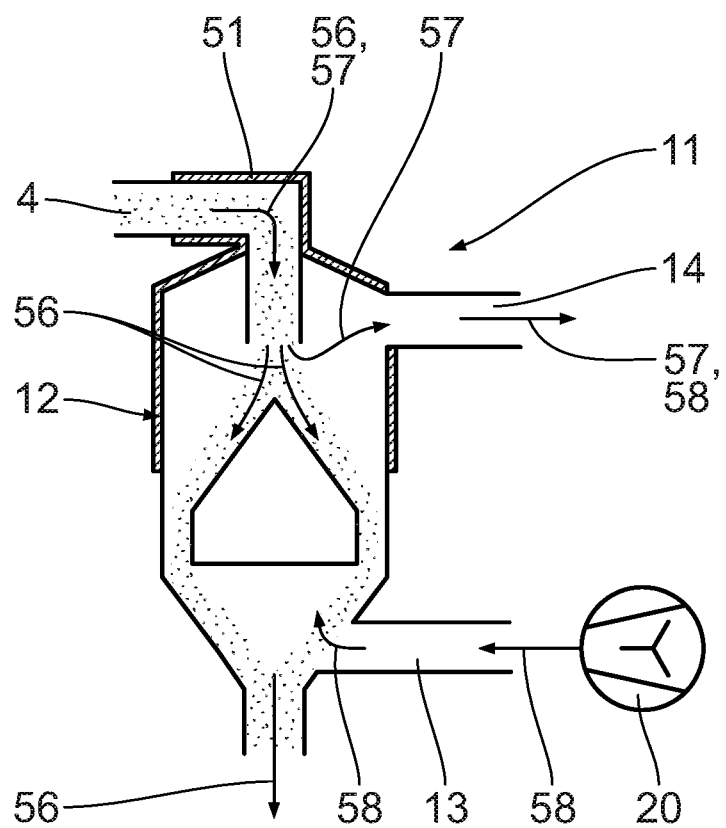
FIG. 2 shows an enlarged sectional illustration of the separation container according to FIG. 1 as a classifier.

A conveyor installation 1 shown in FIGS. 1 and 2 serves for pneumatically conveying plastics granulate which is stockpiled in a container 2. The plastics granulate by means of a dispatching/metering unit 3 at a dispatch location is fed in a metered manner from the container 2 to a conveyor line 4. A plurality of containers 2 which in each case are connected to a separate dispatching/metering unit 3 on the conveyor line 4 can also be provided. However, the plastics granulate can also be supplied in a pre-metered manner from an upstream process, for example in a pelletizing device following an extruder.

The plastics granulate which at the dispatch location 5 is supplied to the conveyor line 4 is impinged with pressurized carrier gas. The carrier gas is air. The carrier air is provided from a compressed air source 6 by way of a filter 7 and compressor 8. The carrier air by compression is provided at the required conveying pressure.

According to the exemplary embodiment shown, a humidification unit 9 is connected to the compressed air line 10 upstream of the dispatch location 5. Compressed air is transported along the compressed air line 10 up to the liquid feed by way of the humidification unit 9. The compressed air on account of the addition of liquid is humidified and is conveyed as humid carrier gas to the dispatch location 5. The compressed air line 10 at the dispatch location 5 opens into the conveyor line 4. The mixture of plastics granulate and the humid carrier air flows along the conveyor line 4. The flow direction of the plastics granulate is characterized by the flow arrow 56. The flow direction of the humid carrier gas is characterized by the flow arrow 57.

It is also conceivable for a further humidification unit to be provided additionally or alternatively to the humidification unit 9 downstream of the dispatch location, in particular along the conveyor line 4. It is also possible for the humidification by way of a separate waterline to be dispensed with, for example when a humid product is conveyed, the humidity of said product being used for the humidification of the carrier gas. In this case, the humid product which dispenses liquid to the carrier gas is understood to be the humidification unit.

The conveyor line 4 is connected to a separation device 11, in particular to a separation container 12. The separation device 11 serves for separating the humid carrier air from the plastics granulate by means of a replacement gas. To this end, a replacement gas unit 13 is provided in order for in particular dry replacement gas to be fed to the separation device 11. The replacement gas is guided so as to be substantially in a counter flow in relation to the gravimetric flow of the plastics granulate. The flow direction of the replacement gas is characterized by the flow arrow 58. The separation device 11, in particular the separation container 12, has an exhaust air line 14 for dispensing the separated and in particular at least in proportions humid carrier air as exhaust air. According to the exemplary embodiment shown, dispensing the exhaust air takes place by way of the exhaust air line 14 to the environment. To this end, the exhaust air can also be separately purified by means of an exhaust air filter or of a cyclone precipitator (neither illustrated).

The separation device 11 is disposed at a target location 15. The location and/or the region where the plastics granulate is to be stored or at least temporarily stored is referred to as the target location. According to the exemplary embodiment shown, the target location 15 comprises a plurality of, in particular three, receiving containers 16 which are in each case embodied as a storage silo. The receiving containers 16 at the target location 15 form a so-called silo battery. The separation device 11 according to FIG. 1 is disposed upstream of the silo battery. The receiving containers 16 are of a substantially identical embodiment. Fewer than three, in particular precisely 1, or more than three receiving containers 16 can also be provided. It is conceivable in particular that the conveyor line 4 is embodied so as to be sequential and/or in a branched manner such that a plurality of conveyor line portions are able to be disposed so as to be mutually parallel and/or in series and interconnected. A conveyor line system of this type serves in particular for connecting one or a plurality of stockpile containers 2 to form one or a plurality of receiving containers 16.

The receiving containers 16 are connected to the separation device 11 by way of a target location conveyor line 17. The separation device 11 is connected to the target location 15, in particular to the individual receiving containers 16, by way of the target location conveyor line 17.

The dispatch location 5 in terms of conveyance is connected to the target location 15 by way of the conveyor line 4, the separation device 11, and the target location conveyor line 17.

On account of the separation device 11 being disposed adjacent to the target location 15, short conveying paths for the plastics granulate result between the separation device 11 and the receiving containers 16.

In particular, the separation device 11 is disposed so as to be close to the floor. The accessibility of the separation device 11, in particular for maintenance and/or repair jobs, is improved on account thereof. In order for a height differential for filling the receiving container 16 from above to be overcome, the target location conveyor line, which is also referred to as the distributor conveyor line, is embodied as a pneumatic conveyor line. To this end, a further compressed air source 6, a filter 7, and a compressor 8 are provided in order for the plastics granulate which is dispatched from the separation container 12 by way of a shut-off unit 18 in the form of a rotary gate valve into the target location conveyor line 17 to be pneumatically conveyed. The shut-off unit 18 is disposed along the conveying path of the plastics granulate, between the separation container 12 and the receiving container 16.

Conveying along the target location conveyor line 17 is performed by means of unsaturated carrier air. Humid carrier air from the upstream transportation step has been separated from the plastics granulate in the separation device 11 and has been discharged by way of the exhaust air line 14. The carrier air that is utilized along the target location conveyor line 17 is also referred to as target location carrier air. The target location carrier air along the target location conveyor line 17 is typically unsaturated, but has a maximum relative humidity of 100%. The carrier air that is used in the target location conveyor line 17 after the separation device 11 has a relative humidity of at most 100%, in particular at most 80%, and in particular at most 60%, in relation to the product temperature and to the pressure at the dispatch location 60 of the target location conveyor line 17. An exhaust air filter 19 for enabling exhaust air to be dispensed to the environment is provided in each case on an upper end side of the receiving containers 16.

The embodiment of the separation container 12 will be explained in more detail by means of FIG. 2. The separation container 12 is embodied as a classifier, in particular as an elbow/counter current classifier. The plastics granulate with the humid carrier gas is fed to the classifier at an upper end by way of the conveyor line 4. The mixture of humid carrier gas and plastics granulate in the direction of gravity falls downward to the shut-off unit (not illustrated in FIG. 2). The replacement gas unit 13 for feeding dry replacement gas to the separation device 11 by means of a blower 20 is disposed at a lower end on the separation container 12, said lower end being opposite the conveyor line 4.

The injected replacement gas flows counter to the dropping plastics granulate and to the humid carrier gas. On account thereof, the humid carrier gas is separated from the plastics granulate and is discharged from the separation container 12 by way of the exhaust air line 14. The separation container 12 and/or the conveyor line 4, in particular in an upper region of the separation device 11, can have a thermal insulation layer to avoid the formation of condensation.

Figure 3:
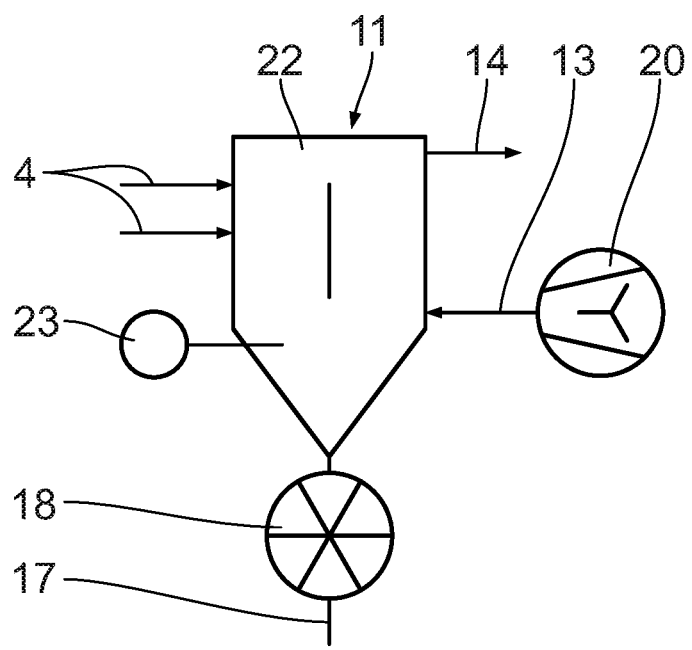
FIG. 3 shows a schematic illustration of a separation container as a solid-matter separator having a replacement gas unit by way of a separate replacement gas feed.

FIG. 3 shows a further embodiment of the separation device. The separation container 22 is embodied as a preliminary precipitator into which a plurality of conveyor lines 4 open out. The preliminary precipitator serves in particularly for the rough separation of the humid carrier gas from the plastics granulate. Surprisingly, it has been found that the preliminary precipitator is very well suitable for the separation of the humid carrier gas. The separation container 22 has a filling level sensor 23 in order for the filling level in the preliminary precipitator to be detected. The filling level sensor 23 is in signalling connection with a filling level monitor (not illustrated in more detail). The filling level monitor can be an integrated component part of a control unit (not illustrated in more detail). The filling level sensor 23, and in particular the filling level monitor, serve for preventing an overflow in the preliminary precipitator, in particular in the event of the material inflow by way of the conveyor lines 4 into the preliminary precipitator over a comparatively long period of time being greater than the material outflow by way of the shut-off unit 18 to the receiving container 16.

Figure 4:
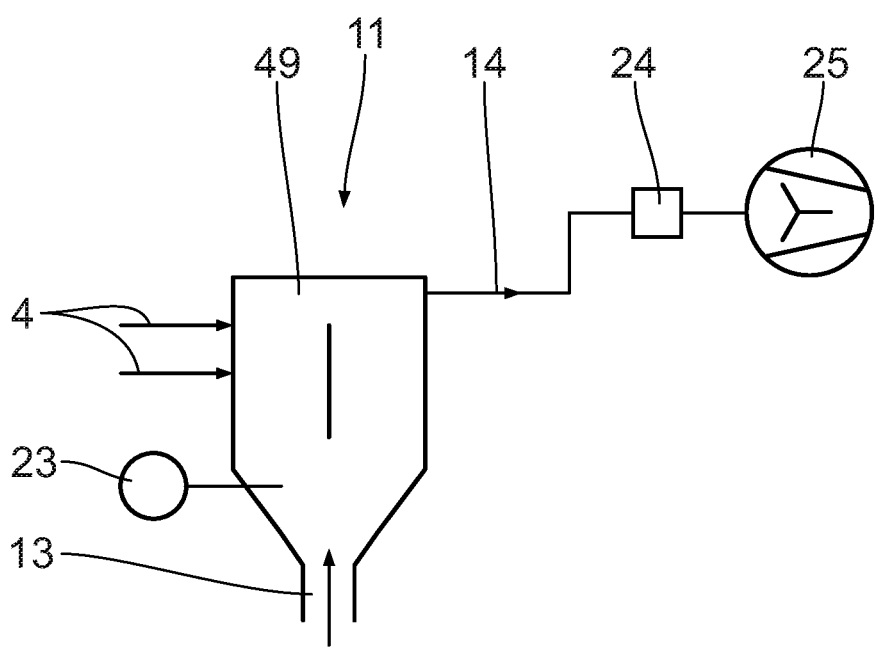
FIG. 4 shows an embodiment of a separation container, corresponding to that of FIG. 3, having a replacement gas feed from the receiving container.

FIG. 4 shows a further embodiment of a separation device. A point of differentiation lies in that the replacement gas unit 13 is embodied so as to be integral to the separation container 49. Rising replacement gas which is utilized as purge gas by the receiving container (not illustrated) in the separation container 49 and is characterized by means of a flow arrow in FIG. 4 is, for example, a displacement gas flow which on account of the input of the bulk product volume into the following portion of the installation, for example into a rotary gate valve, a container, or a pipeline, is displaced from the latter. A separate inflow opening for replacement gas in the separation container 49 is dispensable in this instance. In order for a reliable discharge of the exhaust air to be guaranteed by way of the exhaust air line 14, the exhaust air line 14 by means of a suction ventilator 25 can be discharged to an aspiration 24.

Figure 5:
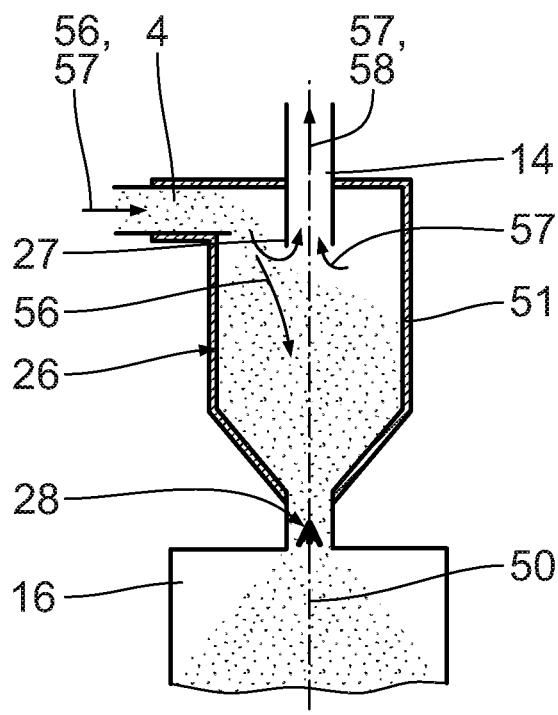
FIG. 5 shows a sectional illustration of a separation container corresponding to that of FIG. 2, as a cyclone precipitator having a shut-off unit.
Figure 6:
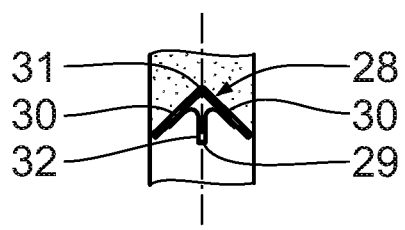
FIGS. 6 and 7 show an enlarged detailed illustration of the shut-off unit according to FIG. 5, as a spring-loaded flap in the closed and the opened arrangement.
Figure 7:
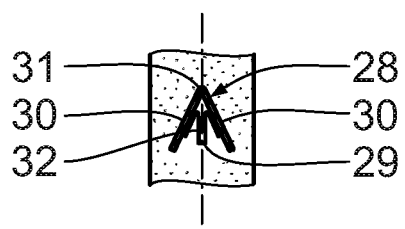

FIGS. 5 to 7 show a further embodiment of a separation device. The separation container 26 is embodied as a cyclone precipitator. The conveyor line 4 is fed in a plane that is perpendicular to the longitudinal axis 50 of the separation container 26, and in a helical flow is guided around a suction port 27 of the exhaust air line 14 that protrudes into the separation container 26. As a result of this helical flow, the plastics granulate is separated from the humid carrier gas, and the humid carrier gas is discharged by way of the exhaust air line 14.

The cyclone precipitator can at least in portions have a thermal insulation 51 on an external shell wall. The thermal insulation 51 is attached in particular as an additional external insulation layer on an external side of the housing of the separation container 26.

A self-regulating shut-off unit 28 in the form of a spring-loaded flap is disposed on the lower end on the separation container 26 that faces the receiving container 16, the functional mode of said flap being explained by means of FIGS. 6 and 7. The spring-loaded flap is fixed by means of arrester 29 along the conveying path from the separation container 26 to the receiving container 16. Two flap parts 30 are articulated so as to be pivotable about a pivot axis 31 on the arrester 29 which is disposed in particular so as to be centric in relation to the cross-sectional area along the conveying path between the separation container 26 and the receiving container 16. The pivot axis 31 is oriented in particular so as to be perpendicular to the material conveying direction. The flap parts 30 by means of spring elements 32 are impinged with a spring force in such a manner that said flap parts 30 are self-actinly repositioned to a closed position according to FIG. 6. The spring elements 32 are embodied in particular as curved leaf springs which are disposed on the lower side of the flap parts 30 that faces away from the material flow and are connected to the arrester 29. The spring elements 32 are embodied as compression springs. The spring elements 32 cause the flap parts 30 to be urged away from the arrester 29. The conveying path from the separation container 26 to the receiving container 16 is closed off in the closed position.

When the separation container 26 is filled with plastics granulate, the backpressure acting on the flap parts 30 increases. As soon as the force that results from the backpressure acting on the flap parts 30 exceeds the specified spring force of the spring element 32 the flap parts 30 are urged downward, counter to the spring force 32, towards the arrester 29. As soon as the backpressure in the separation container 26 as a result of the reduced filling height is lower than the spring force, the spring-loaded flap 30 closes in a self-acting manner. The shut-off unit 28 is embodied in a particularly uncomplicated and direct manner.

Figure 8:
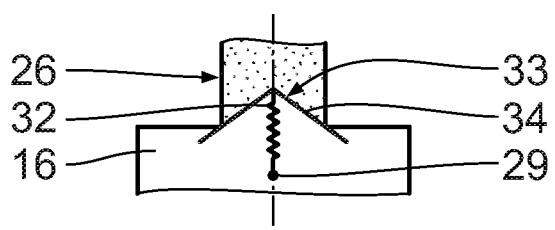
FIGS. 8 and 9 show illustrations of a shut-off unit corresponding to those of FIGS. 6 and 7, as a spring-loaded cone.
Figure 9:
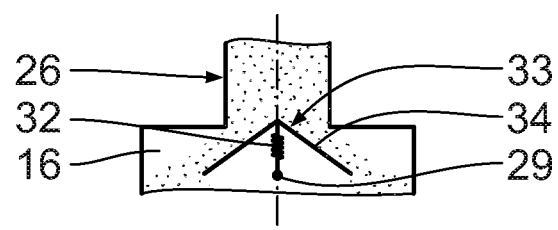

FIGS. 8 and 9 show a further embodiment of a shut-off unit 33. The point of differentiation as compared with the previous shut-off unit 28 lies in that the shut-off unit 33 is embodied as a spring-loaded cone. A further point of differentiation lies in that a single-part cone 34 which is embodied so as to be cone-shaped is provided for shutting off. The cone 34 per se is embodied so as to be rigid and by means of a compression spring 32 is articulated so as to be repositionable in an axial manner on the arrester 29. As the backpressure on the cone 34 in the closed position according to FIG. 8 increases, the axial compression spring 32 is compressed and the cone in its entirety is thus repositioned in an axial manner along the conveying path from the separation container 26 towards the receiving container 16, the conveying path thus being released, as is illustrated in FIG. 9.

Figure 10:
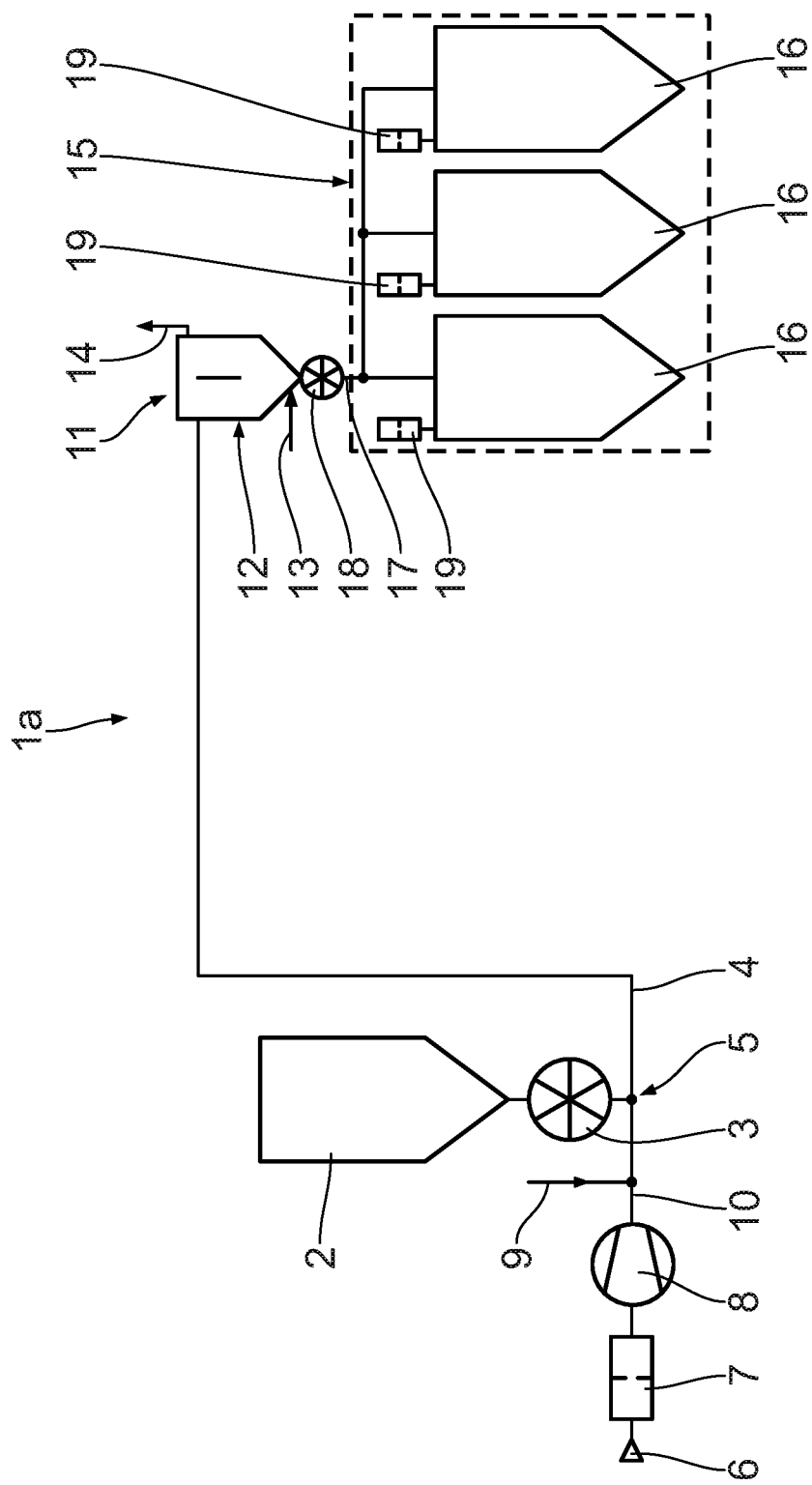
FIG. 10 shows a schematic illustration of a conveyor installation corresponding to that of FIG. 1, wherein the separation container is disposed above the receiving containers.

FIG. 10 shows a further embodiment of a conveyor installation 1a. Components which are equivalent to those that have been explained above with reference to FIGS. 1 to 9 have the same reference signs and are not discussed in detail once again.

In the case of the conveyor installation 1a the separation device 11 that is disposed in front of the silo battery is disposed above the receiving containers 16. On account thereof, the conveying path from the separation device 11 to the receiving containers 16 is additionally shortened. Additionally or alternatively to a short pneumatic conveyance, the conveyance from the separation container 12 to the receiving containers 16 can be performed in particular in a self-acting manner as a result of gravity. The target location conveyor line 17 has in particular only fall pipes which can in particular be disposed in an inclined manner A pneumatic conveyance along the target location conveyor line 17 is not mandatory.

Figure 11:
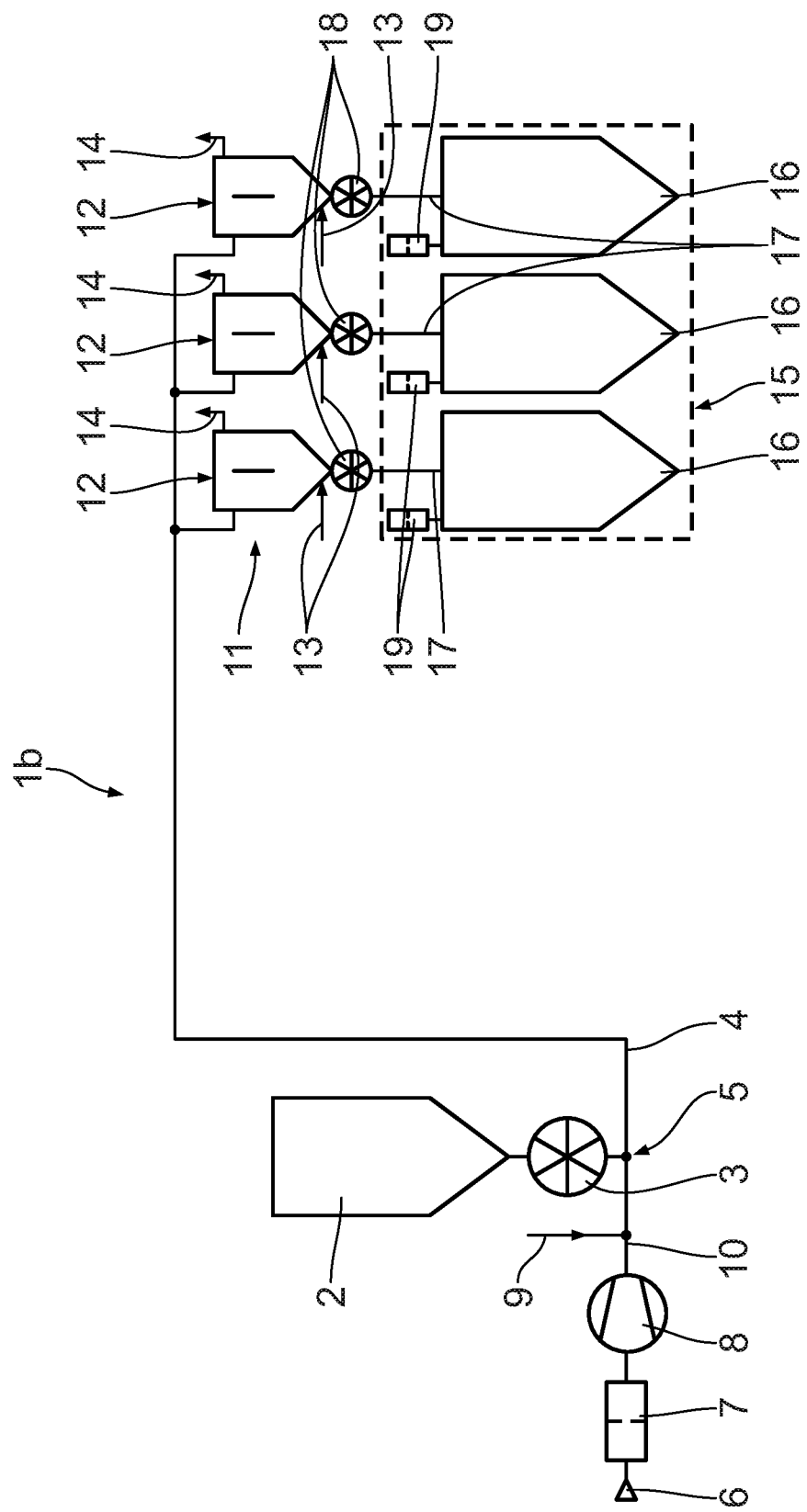
FIG. 11 shows an illustration corresponding to that of FIG. 10, wherein each receiving container is assigned one separation container that is disposed above said receiving container.

FIG. 11 shows a further embodiment of a conveyor installation 1b. Components which are equivalent to those that have been explained above with reference to FIGS. 1 to 10 have the same reference signs and are not discussed in detail once again. In the case of the conveyor installation 1b each receiving container 16 is assigned a dedicated separation device 11. The conveying path along the target location conveyor line 17 is additionally reduced and is composed in particular exclusively of a fall pipe which connects the shut-off unit 18 directly to the receiving container 16.

Figure 12:
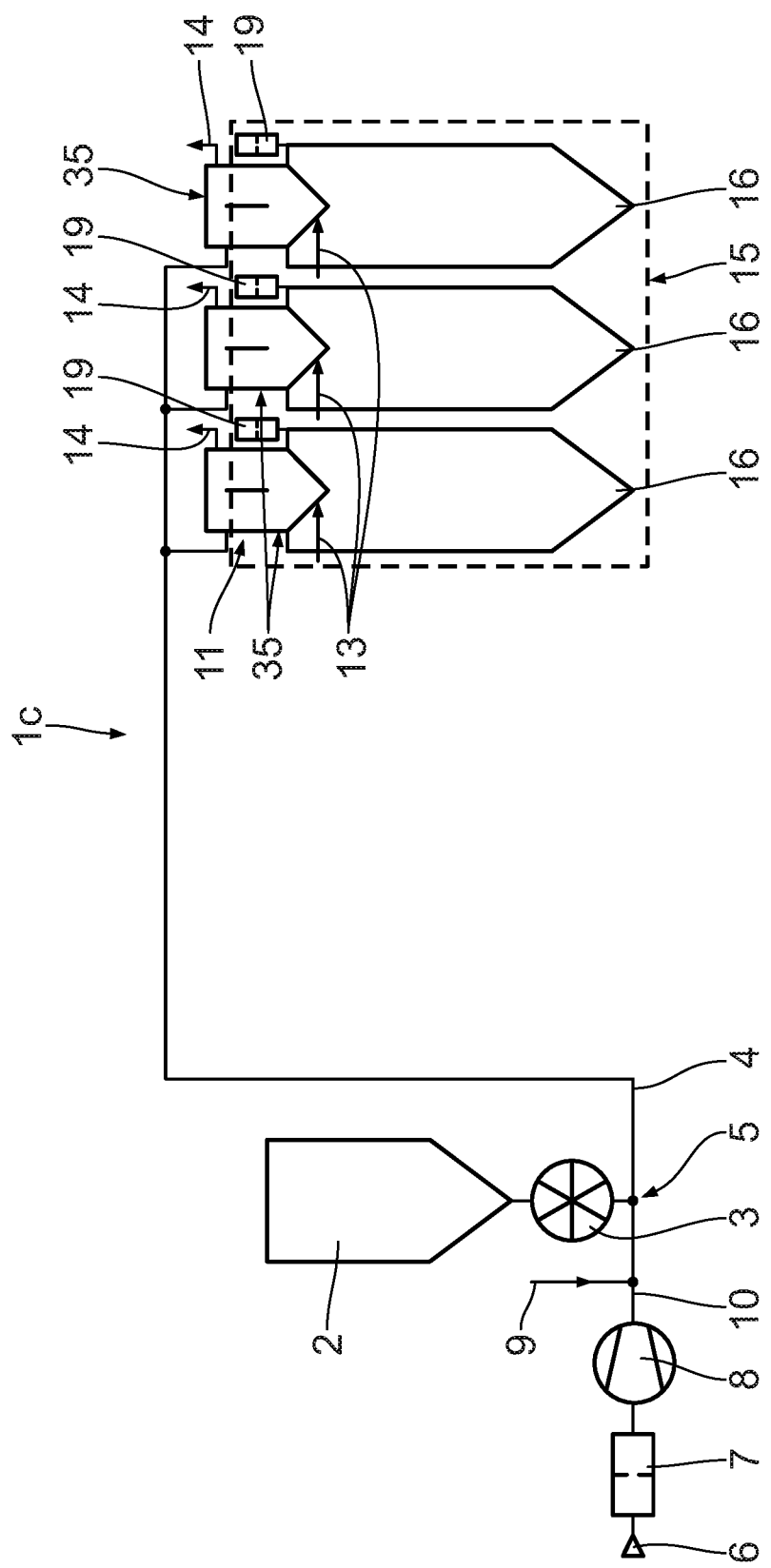
FIG. 12 shows an illustration of a conveyor installation corresponding to that of FIG. 11, wherein the separation containers are in each case disposed directly on the receiving container.

FIG. 12 shows a further embodiment of a conveyor installation 1c. Components which are equivalent to those that have been explained above with reference to FIGS. 1 to 11 have the same reference signs and are not discussed in detail once again. In the case of the conveyor installation 1c the separation containers 35 open in each case directly into the associated receiving container 16. Shut-off units are not provided on any of the separation containers 35. The target location conveyor line 17 is minimized. A separate line portion which is disposed outside the separation container 35 and outside the receiving container 16 is not provided.

Figure 13:
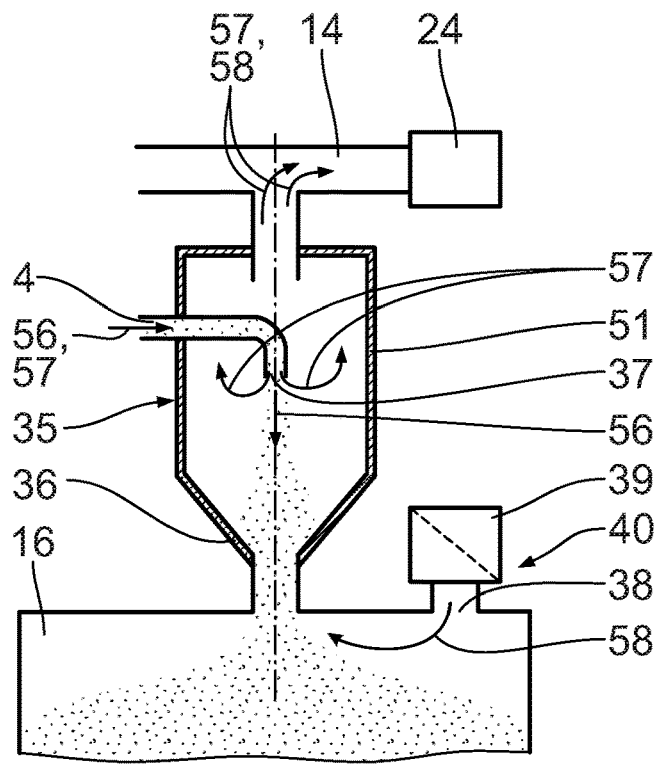
FIG. 13 shows an enlarged sectional illustration of the separation container that is disposed directly on the receiving container, having a replacement gas unit on the receiving container.

The separation container 35 is shown in more detail in FIG. 13. The separation container 35 has a substantially cylindrical basic shape and by way of a conically converging port is placed directly on top of an upper end wall of the receiving container 16.

The conveyor line 4 is fed to the separation container 35 on an external cylinder shell face. The conveyor line 4 protrudes into the separation container 35. The mixture of humid carrier air and plastics granulate is fed to the separation container 35 by way of a dispensing opening 37 of the conveyor line 4. The dispensing opening 37 according to the exemplary embodiment shown faces the receiving container 16. A pipe elbow segment for routing the previously substantially horizontal orientation of the conveyor line 4 in a vertically downward manner by way of a 90° elbow is provided in particular in the end region of the conveyor line 4. The plastics granulate can drop out of the dispensing opening 37, through the conical port 36, directly into the receiving container 16, in particular as a consequence of gravity.

A fresh air opening 38 on which a fresh air filter 39 is disposed is provided at the upper end side of the receiving container 16. The fresh air that is filtered by the fresh air filter 39 serves as a replacement gas and flows counter to the material conveying direction of the plastics granulate, and counter to gravity, from the receiving container 16 into the separation container 35 and causes the humid carrier gas in the separation container 35 to be separated from the plastics granulate. The humid carrier gas is discharged by way of the exhaust air line 14 which is connected to an aspiration 24 (not illustrated). The aspiration 24 can optionally also suction off air in addition to the carrier air, that is to say cause an airflow through the receiving container 16 and through the separation container 35 into the aspiration. The fresh air opening 38 and the fresh air filter 39 form a replacement gas unit 40 for the separation container 35.

Figure 14:
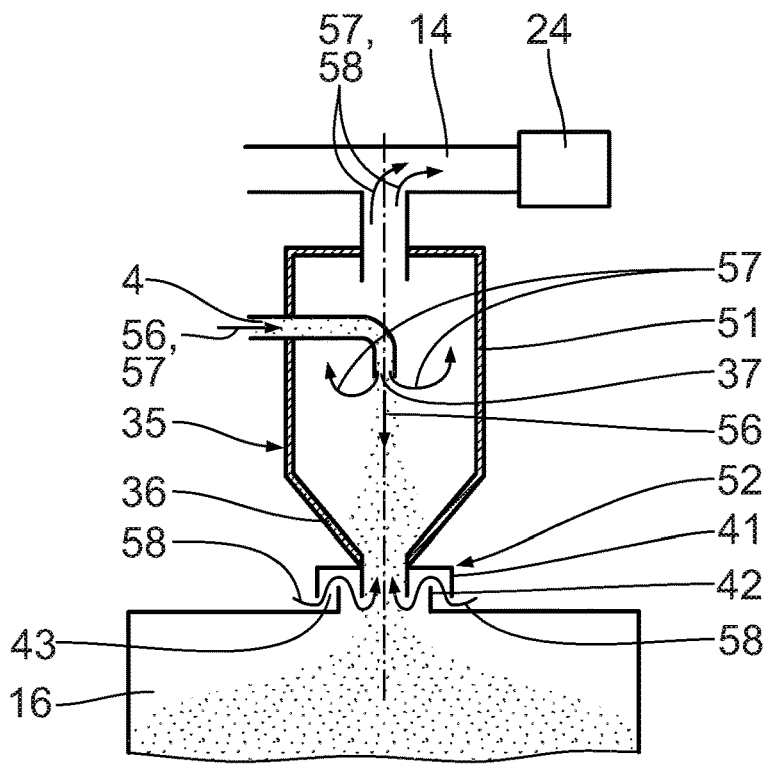
FIG. 14 shows an illustration corresponding to that of FIG. 13, having the replacement gas unit on the port between the separation container and the receiving container.

FIG. 14 shows a further embodiment of a replacement gas unit. The replacement gas unit 52 according to FIG. 14 is embodied as a gap opening in the region of the port 36. To this end, the separation container 35 has a sleeve 41 which is placed on top of an end-side port 42. The gap opening that is disposed between the sleeve 41 and the end-side port 42 forms a replacement gas unit 52. A plurality of in particular slot-shaped gap openings 43 which enable a labyrinth flow for the purge air are provided along the circumference about the longitudinal axis of the receiving container 16 and of the separation container 35. On account of the targeted arrangement of the gap openings 43, the receiving container 16 per se can be embodied so as to be closed. It is conceivable for fresh air filters 39 to be provided in front of the gap openings 43. The separated humid carrier gas is transported away by way of the exhaust air line 14.

Figure 15:
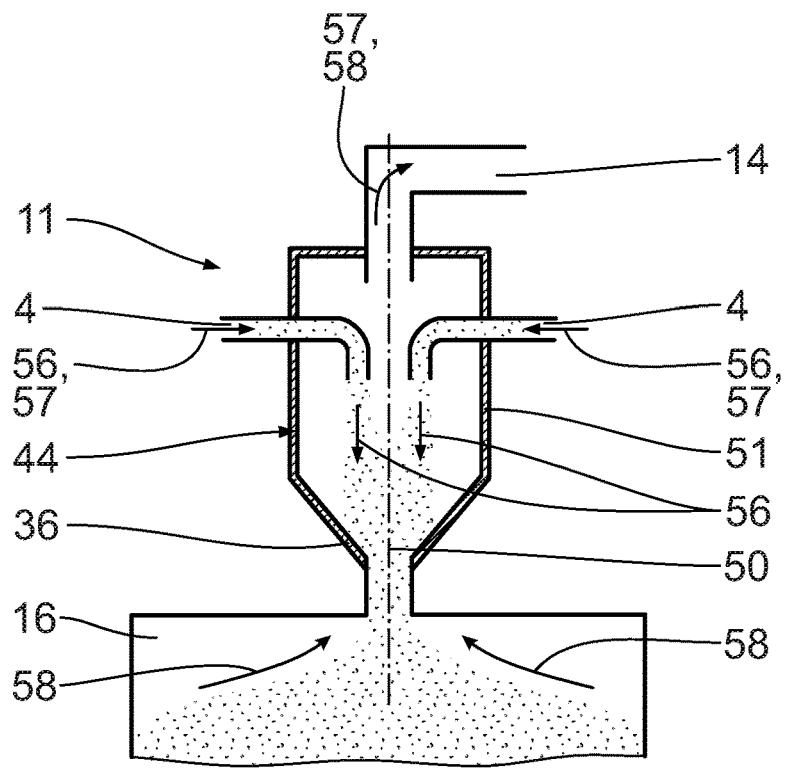
FIG. 15 shows an illustration corresponding to that of FIG. 13 of a separation device to which a plurality of conveyor lines are connected.

FIG. 15 shows a further embodiment of a separation device. The separation container 44 is a small container, in particular a depositing pot, a plurality of, in particular 2, conveyor lines 4 being fed thereto. On account thereof, an efficient utilization of the separation device 11 by way of a plurality of conveyor lines in the separation container 44 results. According to the exemplary embodiment shown, the two conveyor line ends in the substantially cylindrical separation container 44 are disposed so as to be diametrically opposite to the longitudinal axis 50 of said separation container 44, in a plane that is perpendicular to the longitudinal axis 50. It is also conceivable for the various conveyor lines 4 to be able to be disposed in an offset manner along the longitudinal axis 50 of the separation container 44, that is to say offset in height. The arrangement of the conveyor lines 4 in relation to a rotary position to the longitudinal axis 50 can be irregular. In particular, more than two conveyor lines 4 can also open into one and the same separation container 44.

The air that in the form of displacement gas is displaced from the receiving container 16 and is characterized according to the flow arrows 58 serves as the replacement gas, for example. Additionally, degassing (not illustrated) can be provided in order for additional purge air to be directed into the receiving container 16.

Figure 16:
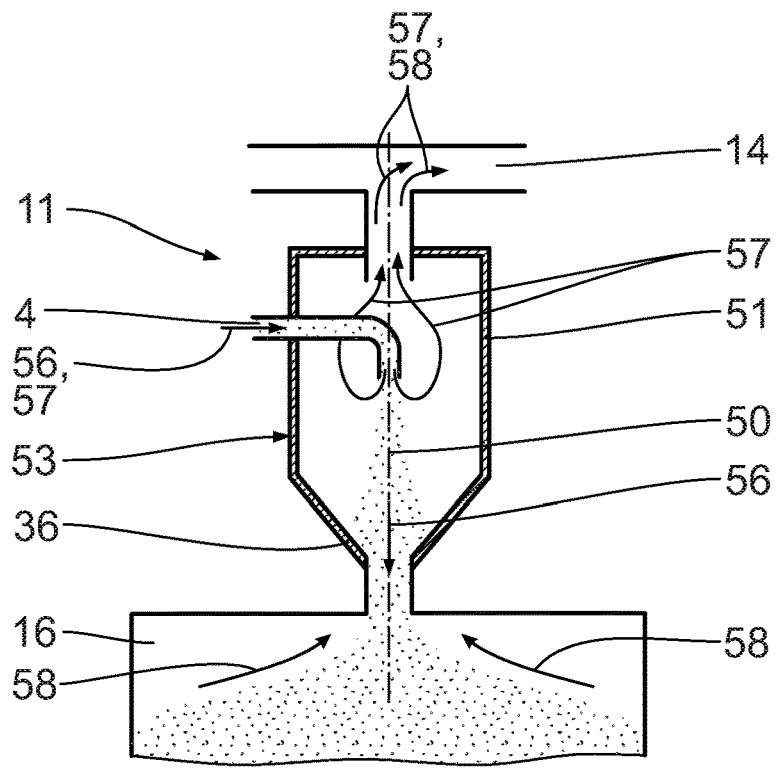
FIG. 16 shows an illustration of the separation container that corresponds to that of FIG. 13, in which the displacement gas from the receiving container is used exclusively as the replacement gas.

FIG. 16 shows a further embodiment of a separation device. In the case of the separation container 53 the replacement gas unit is embodied in an integrated manner, in particular in that the replacement gas as displacement gas emanates from the receiving container 16. The displacement gas flow in the receiving container 16 is displaced on account of the entering volumetric flow of the plastics granulate. A displacement gas flow that is caused on account thereof flows counter to gravity upwards through the receiving container 16 and can be used for purging, that is to say for replacing the humid carrier gas in the separation container 53. The displacement gas flow is characterized by the flow arrow 58.

The receiving container 16 in the case of this embodiment can be embodied in a particularly uncomplicated and compact manner Additional components, in particular for the replacement gas unit, are dispensable. The displaced humid carrier gas is discharged by way of the exhaust air line 14, for example directly to the environment or optionally to an aspiration (not illustrated).

Figure 17:
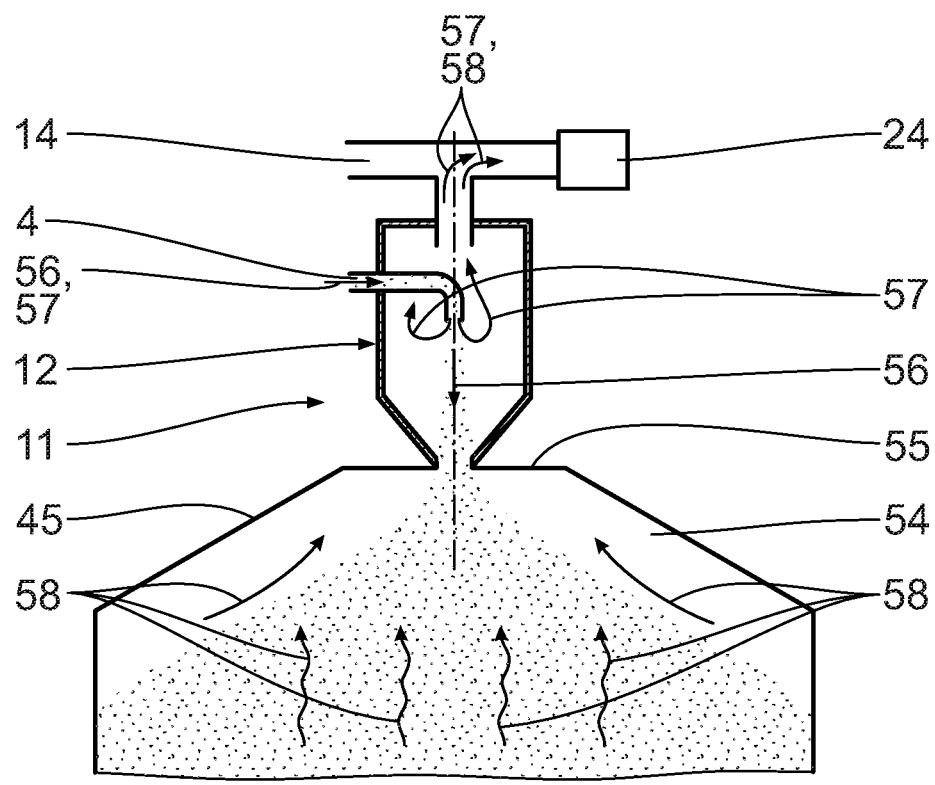
FIG. 17 shows an illustration corresponding to that of FIG. 16, wherein the receiving container has a cross-sectional area of the container that tapers toward the exhaust air line.

FIG. 17 shows a further embodiment of the receiving container. The receiving container 54 has a container cross-sectional area that tapers towards the exhaust air line 14. Poorly perfused corner regions are avoided on account thereof. The receiving container 54 thus has a cone portion 45 that is disposed at the top such that the end face 55 that faces the separation container 12 has a reduced area.

A purge air feed of the receiving container 54, in particular in the region of the lower cone, serves as the replacement gas unit. The purge air which in the receiving container 54 rises upwards counter to gravity, can reach directly the separation container 12 that is placed on top of the receiving container 54, the humid carrier gas being separated from the plastics granulate in the manner already outlined.

Figure 18:
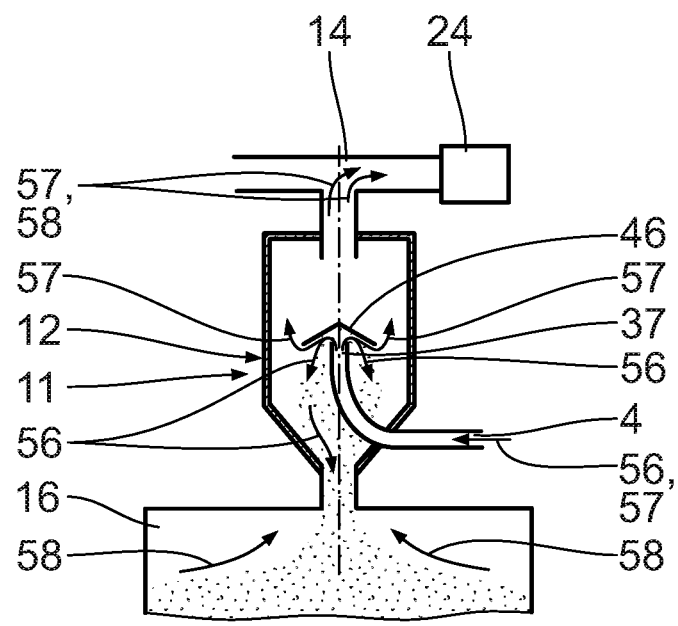
FIG. 18 shows an illustration corresponding to that of FIG. 16, wherein an outflow opening of the conveyor line faces the exhaust air line.

FIG. 18 shows a further embodiment of the separation device. In the case of the separation device 11 the dispensing opening 37 of the conveyor line faces the exhaust air line 14. An impact plate 46 is disposed in the region of the dispensing opening 37, in particular above the dispensing opening 37. The impact plate 46 is embodied in particular in the form of a conical face, wherein the tip of the cone faces away from the receiving container 16.

The mixture of plastics granulate and humid carrier gas is dispensed counter to gravity by way of the dispensing opening 37 and the conveying line 4. The comparatively heavy plastics granulate, as a result of gravity and/or on account of contacting the impact plate 46, can flow downwards into the receiving container 16. The humid carrier gas can flow out directly upwards into the exhaust air line 14. The humid carrier gas is fed along the desired exhaust air flow already to the separation container 12. In particular, the conveyor line 4 is fed to the separation container 12 from below. The conveyor line 4 can be routed on and fastened to the silo battery, in particular the receiving container 16, in a space-saving manner on an upper side.

Figure 19:
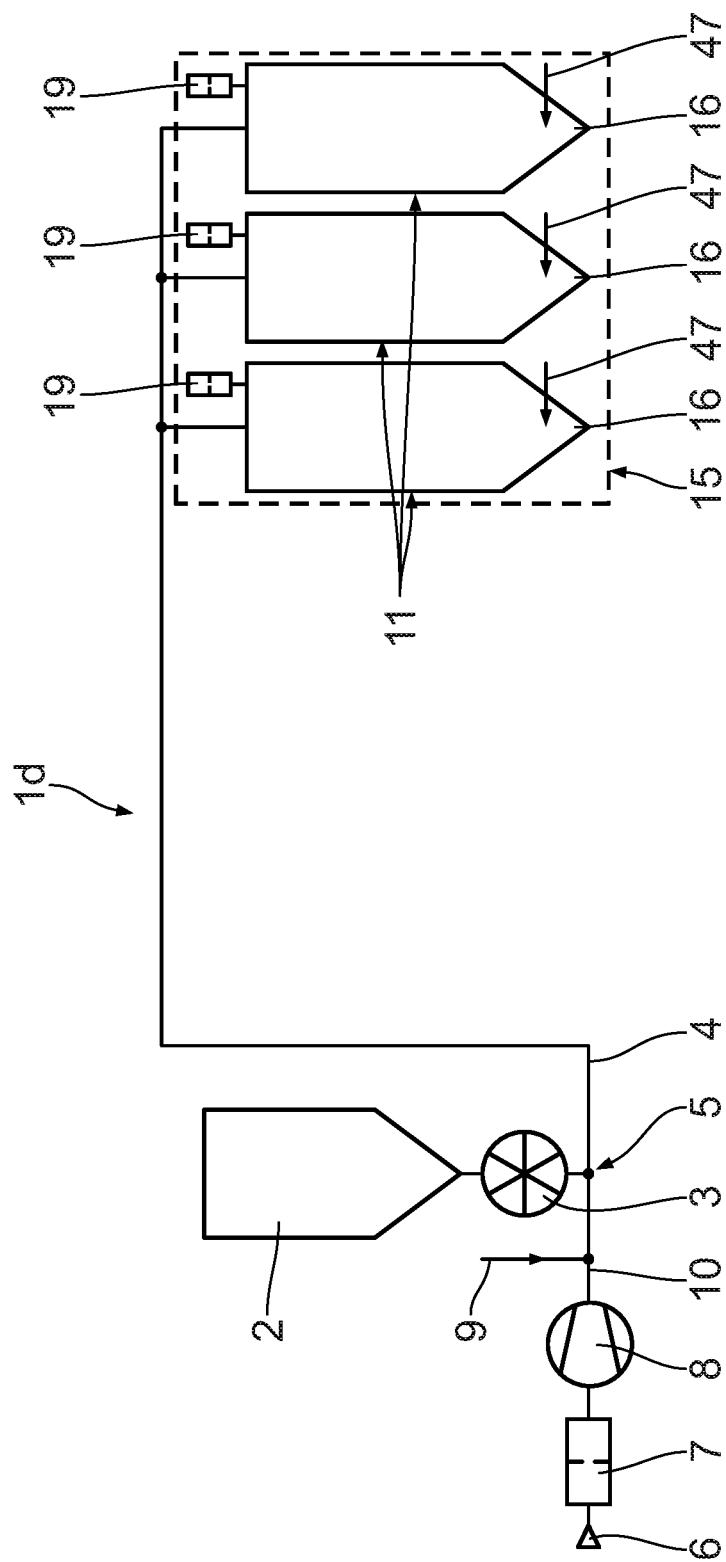
FIG. 19 shows a schematic illustration corresponding to that of FIG. 12 of a conveyor installation in which the target location is connected to the conveyor line.
Figure 20:
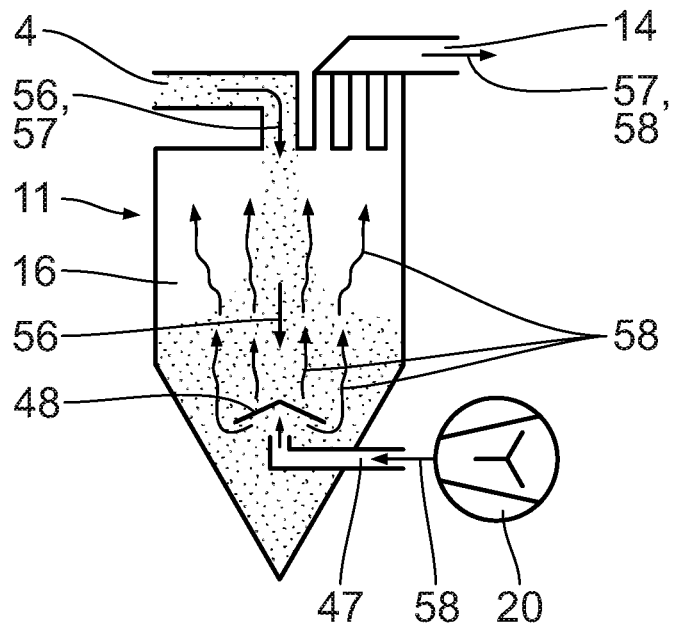
FIG. 20 shows an enlarged detail view of a receiving container having an air infeed according to FIG. 19.

FIGS. 19 and 20 show a further embodiment of a conveyor installation 1*d*. Components which are equivalent to those that have been explained above with reference to FIGS. 1 to 18 have the same reference signs and are not discussed in detail once again.

In the case of the conveyor installation 1*d* the target location 15 is connected to the conveyor line 4. The respective separation devices 11 are integrated in the receiving containers 16. The feed of plastics granulate with humid carrier gas is performed by way of one or a plurality of conveyor lines 4 directly into the receiving container 16. The humid carrier gas fed to the receiving container 16 is directly separated by way of replacement gas which is fed as purge air in the lower cone region of the receiving container 16. The purge line at the lower cone region of the receiving container 16 forms the replacement gas unit 47. The feed of the replacement gas by way of the replacement gas unit 47 is performed by means of the purge air blower 20.

According to the exemplary embodiment shown, an air deflection plate 48 can be disposed in the region of the purge gas feed to the receiving container 16.

Figure 21:
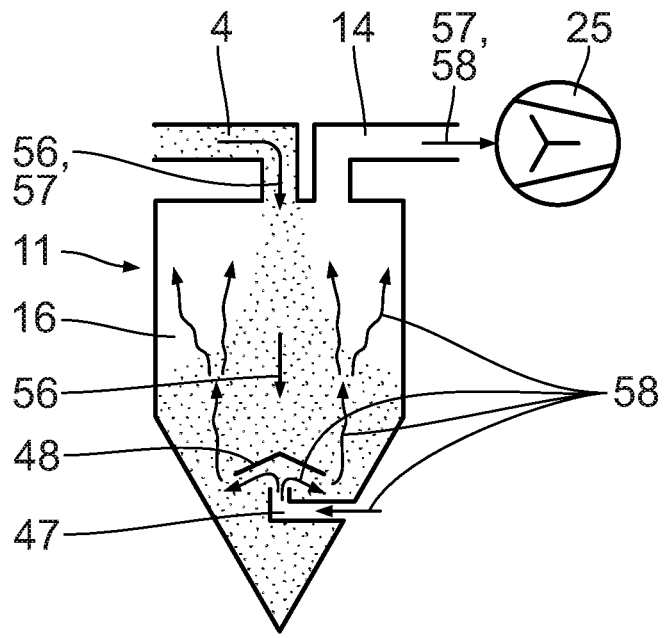
FIG. 21 shows an illustration corresponding to that of FIG. 20 of a receiving container according to a further embodiment having an aspiration.

FIG. 21 shows a further embodiment of the separation device 11 that is integrated in the receiving container 16. The point of differentiation in relation to the previous exemplary embodiment lies in that an aspiration 24 is provided on the exhaust air line 14.

Figure 22:
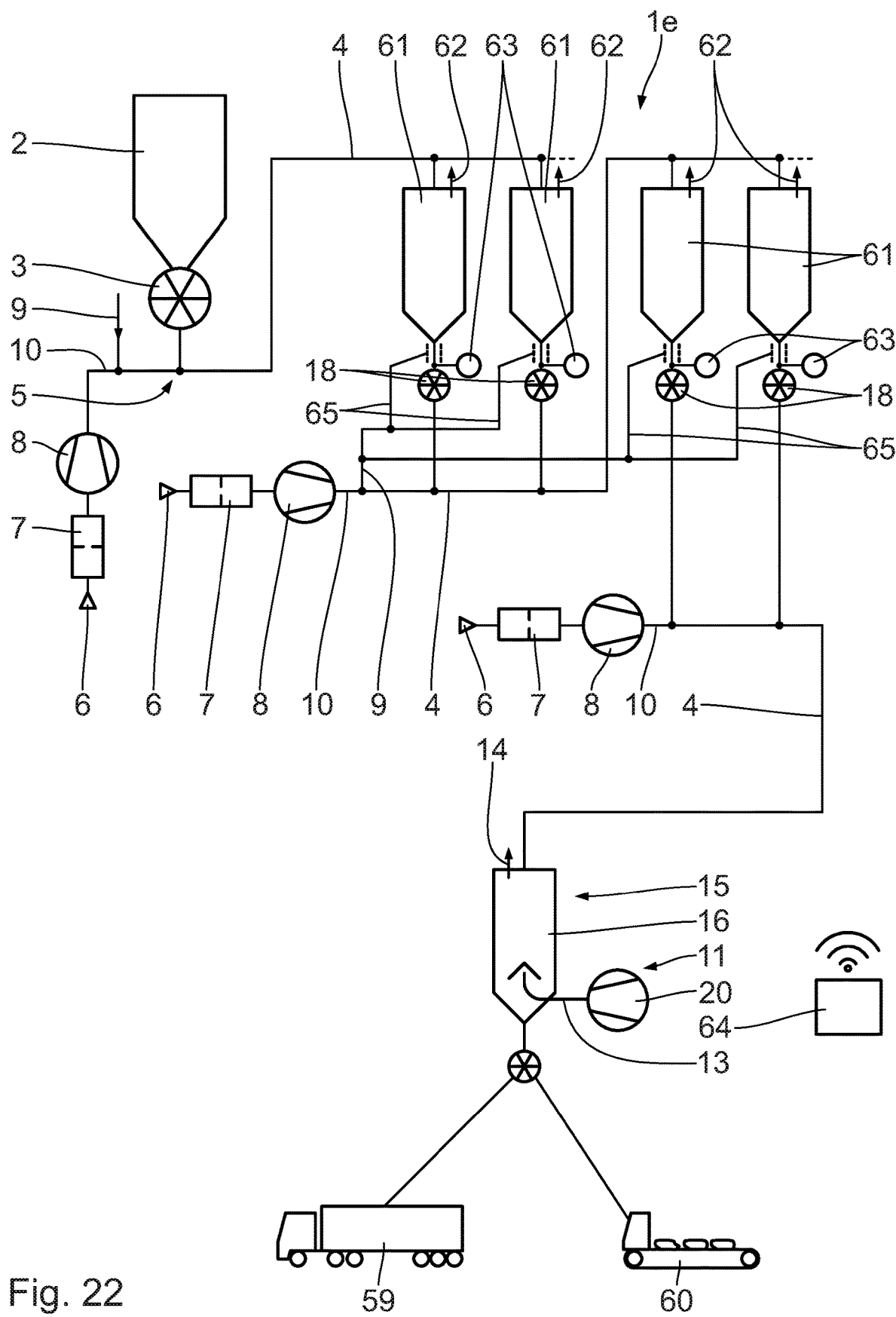
FIG. 22 shows a schematic illustration corresponding to that of FIG. 1 of a conveyor installation according to a further embodiment.

FIG. 22 shows a further embodiment of a conveyor installation 1*e*. Components which are equivalent to those that have been explained above with reference to FIGS. 1 to 21 have the same reference signs and are not discussed in detail once again.

In the case of the conveyor installation 1*e* the receiving container 16 at the target location 15 is embodied in the form of a loading silo. A plurality of loading silos 16 can also be provided at the target location 15.

Replacement gas is fed to the receiving container 16 by way of the replacement gas unit 13 at the lower side of the receiving container 16. The humid carrier gas which together with the plastics granulate is fed to the receiving container 16 at the upper end side by way of the conveyor line 4 can escape by way of the exhaust air line 14 that is likewise disposed on the upper end side. A reliable separation of the humid carrier gas from the plastics granulate is guaranteed at the target location 15.

The plastics granulate is temporarily stored in the loading silo and for further transportation is dispensed onto a transport vehicle 59 or onto a transportable container and/or bagged in sacks in a packing machine 60.

As opposed to the previous exemplary embodiments, a plurality of storage containers 61 are disposed so as to be mutually parallel along the conveyor line 4 and/or is sequentially along the conveyor line 4 in the case of the conveyor installation 1*e*. As is indicated in FIG. 22, more than two storage containers 61 can in each case also be connected in parallel beside one another to the conveyor line. It is also conceivable that in each case only one storage container 61 is provided. It is also conceivable for more than two stages of sequentially disposed storage containers 61 to be provided.

The storage container 61 can be embodied, for example, as a mixing silo, as a degassing silo, or as a warehouse silo. The storage container 61 has in each case one depositing line 62 which according to the exemplary embodiment shown is in each case disposed on the upper end side of the storage container 61. The depositing line 62 enables the deposition of carrier air from the storage container 61. No active gas replacement by means of replacement gas takes place in the storage containers 61.

In each case one shut-off unit 18 in the form of a cellular wheel is provided on the storage containers 61. A sensor element 63 for measuring the humidity of the plastics granulate is disposed between the respective shut-off unit 18 of a storage container 61 and the storage container 61. The sensor element 63 is in signalling connection with a schematically illustrated control unit 64. The signalling connection can be wire-bound or wireless. The control unit 64 according to the exemplary embodiment shown is connected to the sensor element 63 in a wireless manner by way of a radio connection.

The measured value which is determined by means of the sensor element 63 can be used as a control parameter for the infeed of water by means of the humidification unit 9. The control unit 64 in this case is embodied as a regulator unit 64 which is bi-directionally connected to the sensor element 64 and to the humidification units 9, in order for the addition of humidity to be established so as to depend on the actual humidity of the plastics granulate.

A condensation outflow line 65 is disposed in each case on the lower side of the storage container 61. The condensation outflow line 65 serves for collecting and discharging condensate from the storage container 61 in a targeted manner. Thus it is particularly avoided that condensed water accumulates back into the storage container 61. In particular, the downstream regulation of the humidity addition can be performed more precisely.

The condensate can be returned to the at least one of the humidification units 9 by way of the condensation outflow line 65. The condensate from the storage container 61 can be utilized for the humidification of the carrier gas upstream and/or downstream along the conveyor line 4. It can also be done without returning the condensate.

No additional humidification of the carrier gas is performed along the last of the conveyor portions, the conveyor line 4. Neither a humidification unit 9 nor a connection to the condensation outflow line 65 is provided along the conveyor line 4.

The humidification of the carrier gas along the last of the conveyor portions of the conveyor line 4 can be performed in such way that condensed water from the storage container 61 can be conveyed together with the plastics granulate. The liquid feed into the conveyor line 4 is performed from the storage containers 61.

What is claimed is:

1. A conveyor installation for plastics granulate, the conveyor installation comprising:
   a dispatch location at which the plastics granulate with a pressurized carrier gas is dispatched into a conveyor line;
   a target location that in terms of conveyance is connected to the dispatch location;
   a humidification unit for humidifying at least one of the carrier gas and the plastics granulate by adding liquid such that the carrier gas has a relative humidity of at least 60% and at most 200% at an end of the conveyor line, wherein a separation device for separating the humid carrier gas from the plastics granulate via a replacement gas is provided at the target location, wherein the replacement gas is guided in the separation device such that the replacement gas is in a counter flow relative to a gravimetric flow of the plastics granulate.

2. A conveyor installation according to claim 1, wherein at least one receiving container is disposed at the target location, wherein separation of the humid carrier gas is performed without any additional heating of the replacement gas.

3. A conveyor installation according to claim 1, wherein the separation device is connected to the conveyor line, wherein the separation device is connected to at least one receiving container at the target location via at least one target location conveyor line, wherein the plastics granulate is transported along at least a portion of the conveyor line via the humid carrier gas.

4. A conveyor installation according to claim 3, wherein the separation device has a separation container connected to a receiving container.

5. A conveyor installation according to claim 4, wherein a plurality of receiving containers are connected to the separation container.

6. A conveyor installation according to claim 4, wherein the separation container is a solid matter deposition container which is embodied as one of the group of a preliminary precipitator, a total precipitator, a cyclone and a classifier.

7. A conveyor installation according to claim 4, wherein the separation container is embodied as an elbow/counter flow classifier.

8. A conveyor installation according to claim 4, wherein a shut-off unit is disposed between the separation container and the receiving container.

9. A conveyor installation according to claim 4, wherein the separation container has a filling-level monitor having at least one filling-level sensor.

10. A conveyor installation according to claim 1, wherein the target location is connected to the conveyor line wherein the separation device is integrated in a receiving container.

11. A conveyor installation according to claim 1, wherein an exhaust air line for expelling exhaust air having carrier air that at least in proportions is humid to at least one of the environment and to an aspiration is connected to the conveyor installation at the target location.

12. A conveyor installation according to claim 1, wherein an exhaust air line is connected to at least one of a separation container and a receiving container.

13. A conveyor installation according to claim 1, wherein a plurality of conveyor lines are connected to the separation device.

14. A conveyor installation according to claim 1, wherein a plurality of conveyor lines are connected to a separation container.

15. A conveyor installation according to claim 1, wherein a heater for heating the replacement gas is dispensable for the separation device.

16. A conveyor installation for plastics granulate, the conveyor installation comprising:
    a dispatch location at which the plastics granulate with a pressurized carrier gas is dispatched into a conveyor line;
    a target location that in terms of conveyance is connected to the dispatch location;
    a humidification unit for humidifying at least one of the carrier gas and the plastics granulate by adding liquid such that the carrier gas has a relative humidity of at least 60% and at most 200% at an end of the conveyor line, wherein a separation device for separating the humid carrier gas from the plastics granulate is provided at the target location, wherein a replacement gas unit for replacing the humid carrier air with the replacement gas is provided, wherein the replacement gas unit is disposed at least one of on the separation device and on a receiving container.

17. A method for conveying plastics granulate, the method comprising the steps:
    dispatching plastics granulate into a conveyor line at a dispatch location with a pressurized carrier gas;
    conveying the plastics granulate to a target location that in terms of conveyance is connected to the dispatch location;
    humidifying at least one of the carrier gas and the plastics granulate by adding liquid such that the carrier gas has a relative humidity of at least 60% and at most 200% at an end of the conveyor line;

separating the humid carrier gas from the plastics granulate in a separation device by feeding a replacement gas, the replacement gas being guided in a counter flow relative to a gravimetric flow of the plastics granulate.

18. A method according to claim 17, wherein the separation of the humid carrier gas is performed without any additional heating of the replacement gas.

19. A conveyor installation for plastics granulate, the conveyor installation comprising:

a dispatch location at which the plastics granulate with a pressurized carrier gas is dispatched into a conveyor line;

a target location that in terms of conveyance is connected to the dispatch location;

a humidification unit for humidifying at least one of the carrier gas and the plastics granulate by adding liquid such that the carrier gas has a relative humidity of at least 60% and at most 200% at an end of the conveyor line, the humidification unit being located upstream of the dispatch location with respect to a flow of the pressurized carrier gas;

a separation device for separating the humid carrier gas from the plastics granulate via a replacement gas, wherein the replacement gas is guided in the separation device such that the replacement gas is in a counter flow relative to a gravimetric flow of the plastics granulate, wherein the replacement gas replaces the humid carrier gas, the plastics granulate being transported from the separation device to the target location, the separation device being located downstream of the humidification unit and the dispatch location with respect to the flow of the pressurized carrier gas, the target location being located downstream of the separation device, the humidification unit and the dispatch location with respect to the flow of the pressurized carrier gas.

20. A conveyor installation according to claim 19, wherein the separation device comprises an exhaust outlet, the humid carrier gas exiting the separation device to provide exhausted humid carrier gas, wherein the exhausted humid carrier gas does not return to the separation device, the plastics granulate being transported from the separation device to at least one receiving container at the target location via a conveying gas, wherein the plastics granulate is transported along at least a portion of the conveyor line via the humid carrier gas.

* * * * *